United States Patent
Feil

(10) Patent No.: US 8,896,481 B2
(45) Date of Patent: Nov. 25, 2014

(54) MONITORING A PRODUCTION OR CONVEYOR ENVIRONMENT BY MEANS OF RADAR

(75) Inventor: Peter Feil, Ulm (DE)

(73) Assignee: Endress + Hauser GmbH + Co. KG, Maulburg (DE)

(*) Notice: Subject to any disclaimer, the term of this patent is extended or adjusted under 35 U.S.C. 154(b) by 441 days.

(21) Appl. No.: 13/402,611

(22) Filed: Feb. 22, 2012

(65) Prior Publication Data

US 2012/0212365 A1    Aug. 23, 2012

(30) Foreign Application Priority Data

Feb. 23, 2011  (DE) .......................... 10 2011 004 617
May 13, 2011  (DE) .......................... 10 2011 075 826

(51) Int. Cl.
*G01S 13/48* (2006.01)
*G01S 13/88* (2006.01)
*G01S 13/42* (2006.01)

(52) U.S. Cl.
CPC ........ *G01S 13/88* (2013.01); *G01S 13/42* (2013.01)
USPC .......................................... 342/107; 342/147

(58) Field of Classification Search
CPC ......... G01S 3/74; G01S 13/931; G01S 13/48; G01S 13/584; H01Q 3/24
USPC .......................................... 342/107, 147, 155
See application file for complete search history.

(56) References Cited

U.S. PATENT DOCUMENTS

| | | | |
|---|---|---|---|
| 5,754,099 A | 5/1998 | Nishimura | |
| 7,151,482 B2* | 12/2006 | Natsume et al. | 342/147 |
| 7,714,782 B2* | 5/2010 | Davis et al. | 342/377 |
| 7,859,450 B2* | 12/2010 | Shirakawa et al. | 342/147 |
| 8,253,622 B2* | 8/2012 | Hampel et al. | 342/147 |
| 8,446,312 B2* | 5/2013 | Kanamoto et al. | 342/149 |

(Continued)

FOREIGN PATENT DOCUMENTS

| | | |
|---|---|---|
| DE | 19511210 A1 | 9/1995 |
| DE | 19511210 A1 | 9/1995 |
| DE | 102011004617 A1 * | 1/2013 |

OTHER PUBLICATIONS

Peter Feil et al., "Active Switched Antenna Array for 77 GHz Digital Beamforming Radar", Apr. 15, 2011, Proceedings of the 5th European Confernece on, Issue: Apr. 15, 2011.

(Continued)

*Primary Examiner* — John B Sotomayor
(74) *Attorney, Agent, or Firm* — Bacon & Thomas, PLLC

(57) ABSTRACT

A method using an antenna arrangement. The antenna arrangement includes a switched transmission antenna array with a number of transmission antennas, which radiate a radar transmission signal one after the other corresponding to a predetermined switching sequence. A first receiving antenna and a second receiving antenna receive the transmitted radar signals and reflected by at least one radar target. A first set of received signals by the first receiving antenna during the switching sequence of the transmission antenna array; receiving a second set of received signals by the second receiving antenna simultaneously with receiving the first set of received signals by the first receiving antenna during the switching sequence of the transmission antenna array; and from these signals the angular position of the at least one radar target based on the first set and the second set of received signals using an ESPRIT method is determined.

15 Claims, 7 Drawing Sheets

(56) References Cited

U.S. PATENT DOCUMENTS

| | | | |
|---|---|---|---|
| 2004/0183719 A1* | 9/2004 | Natsume et al. | 342/147 |
| 2006/0262007 A1 | 11/2006 | Bonthron | |
| 2008/0258964 A1* | 10/2008 | Schoeberl et al. | 342/189 |
| 2009/0079617 A1* | 3/2009 | Shirakawa et al. | 342/146 |
| 2011/0001659 A1* | 1/2011 | Hampel et al. | 342/120 |
| 2012/0182174 A1* | 7/2012 | Feil | 342/113 |
| 2012/0212365 A1* | 8/2012 | Feil | 342/107 |

OTHER PUBLICATIONS

W. Mayer et al., "A Compact 24 GHz Sensor for Beam Forming and Imaging", Control, Automation, Robotics and Vision, 2006.

Karl Nienhaus et al., "An Experimental Study on Using Electronically Scanning Microwave Radar Systems on Surface Mining Machines", In: Radar Conference, 2007, IEEE, Issue Date: Apr. 17-20, 2007.

A. Paulraj et al., "A Subspace Rotation Approach to Signal Parameter Estimation", Proceedings of the IEEE, Jul. 1986, vol. 74, No. 7.

A. Paulraj et al., "Estimation of Signal Parameters via Rotational Invariance Techniques-ESPRIT", Circuits, Systems and Computers, 1985.

A. Paulraj et al., "A Subspace Rotation Approach to Estimation of Parameters of Cisoids in Noise", Acoustics, Speech and Signal Processing, IEEE, Oct. 1986.

Paulraj, A., Roy, R. and Kailath, T., A Subspace Rotation Approach to Signal Parameter Estimation, IEEE, Jul. 1986, vol. 74, No. 7.

* cited by examiner

MONITORING A PRODUCTION OR CONVEYOR ENVIRONMENT BY MEANS OF RADAR

TECHNICAL FIELD

The invention relates to a method for registering a production or conveyor environment by means of radar as well as use of an antenna arrangement for registering a production or conveyor environment. Furthermore, the invention relates to a radar apparatus.

BACKGROUND DISCUSSION

In the area of process automation technology radar can be applied for registering a production or conveyor environment. Radar offers the opportunity to determine the distance and position of objects and enables the monitoring of production or conveyor plants. However production and conveyor environments are now characterized by a material flow and a dynamics, which frequently makes the application of radar difficult. Especially with moving objects, determination of angular position often proves to be difficult, because the relative velocity between the object and the radar apparatus causes additional phase shifts in the received signals, which make determining the angular position difficult.

SUMMARY OF THE INVENTION

It is an object of the invention to enable a simple, quick and exact registration of a production or conveyor environment by means of radar.

A method of the invention for registering a production or conveyor environment by means of radar is performed using an antenna arrangement, which includes a switched transmission antenna array with a plurality of transmission antennas, which correspondingly radiate radar transmission signals in a predetermined switching sequence one after the other, a first receiving antenna and a second receiving antenna to receive the radar signals radiated by the transmission antenna array and reflected by at least one radar target. The method includes receiving a first set of received signals by the first receiving antenna during the switching sequence of the transmission antenna array; receiving a second set of received signals by the second receiving antenna during the switching sequence of the transmission antenna array simultaneously with the receiving of the first set of received signals by the first receiving antenna, and determining the angular position of at least one radar target from the first set and the second set of received signals by using an ESPRIT (Estimation of Signal Parameters via Rotational Invariance Techniques) method.

The combination of a switched transmission antenna array with two receiving antennas working in parallel corresponds to an equivalent arrangement, which includes two equivalent receiving antenna arrays working at the same time and shifted relative to one another. The properties of these two receiving antenna arrays are identical, so an application of the ESPRIT method is possible. The phase shift between the two equivalent receiving antenna arrays depends only on the angular placement of the object(s) to be registered. The reason for this is that the additional phase progression, which is brought about by a movement of the object(s) during the switching sequence of the transmission antenna array, affects the phases of the received signals registered by the two equivalent receiving antenna arrays in an identical manner. Since the ESPRIT method only evaluates the relative phase relationship between the signals registered by the first receiving antenna and the signals registered by the second receiving antenna at the same time, the phase contributions caused by velocity play no role with the application of the ESPRIT method, because the phase contributions equally affect the phases of the signals registered by the two receiving antennas and, consequently, yield no contribution to the relative phase between the two sets of received signals. In this way, consequently, the angular position of the object(s) can be determined from the relative phase between the two sets of received signals by means of the ESPRIT method completely independently of the velocity of the object(s). The method of the invention also enables an exact determination of the angular placement of moving objects. In this way, it is possible to register both static as well as moving objects in a production or conveyor environment by means of radar. This enables monitoring of the production or conveyor environment. The required antenna arrangement can be realized cost effectively.

A radar apparatus of the invention is designed to register a production or conveyor environment and includes a switched transmission antenna array with a plurality of transmission antennas, which radiate radar transmission signals corresponding to a predetermined switching sequence one after the other, a first receiving antenna for receiving a first set of received signals, which were radiated by the switched transmission antenna array and reflected by at least one radar target, a second receiving antenna for receiving a second set of received signals, which were radiated by the switched transmission antenna array and reflected by at least one radar target, and an evaluation unit, which determines the angular placement of the at least one radar target based on the first set of received signals and the second set of received signals using an ESPRIT method.

BRIEF DESCRIPTION OF THE DRAWINGS

In the following, the invention will now be explained in greater detail based on examples of embodiments illustrated in the drawing, the figures of which show as follows.

DETAILED DISCUSSION IN CONJUNCTION WITH THE DRAWINGS

In process automation technology, radar systems are especially applied to monitor production plants and conveyor plants. Many radar applications in process automation technology are for distance measurements, for example, the determination of a fill level in a container or tank. In other applications, the position of objects relative to a radar sensor is to be determined and monitored. A radar determination of the position of objects includes determining the distance and angular placement of the objects relative to the radar sensor. Radar evaluation is especially difficult when the distance and angular placement of moving objects should be determined. Especially in the application of radar systems in the area of conveyor technology, it is often required to determine the distance and angular placement of moving objects.

Figure 1:
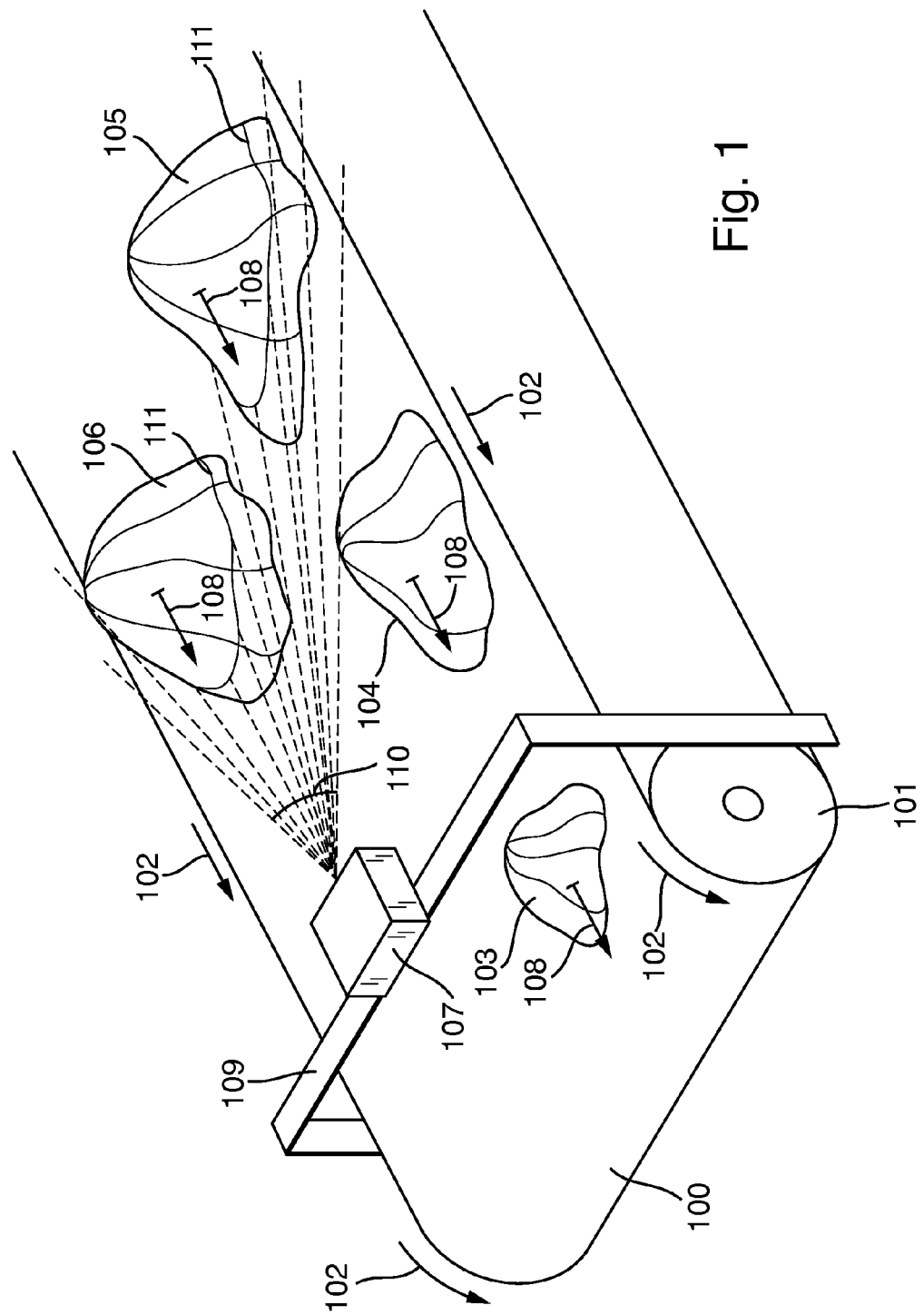
FIG. 1 is a conveyor plant monitored by means of a radar sensor.

FIG. 1 shows an example of an application of radar technology for monitoring a conveyor plant. The system to be monitored is a conveyor belt 100, which is designed for the transport of bulk goods. Conveyor belt 100 could be, for example, a conveyor belt, which is applied in brown coal mining to convey brown coal.

Conveyor belt 100 is moved at a constant speed via a roller 101. The movement of the conveyor belt is illustrated by the arrows 102 in FIG. 1. The bulk good, for example, brown coal chunks, is piled upon the conveyor belt 100 in an irregular distribution. In FIG. 1 four bulk good piles 103-106, which have arisen as a result of the irregular piling, are to be seen.

For registering the transported bulk good and for monitoring the conveyor plant, a suitable radar sensor 107 is required; radar sensor 107 is designed to register the distances and angular positions of bulk good piles passing by. In such case, relative to the locationally fixed radar sensor 107, the bulk good piles 103-106, however, move with a velocity, which is illustrated in FIG. 1 by the arrows 108. For registering the bulk good flowing past, consequently, a radar sensor 107 would be desirable, with which the distances and the angular positions can be rapidly and reliably determined also in the case of moving objects. One such radar sensor 107, for example, could be mounted on a horizontal beam 109 above conveyor belt 100. Preferably, radar sensor 107 could be placed centrally over the conveyor belt 100 and slightly tilted from the horizontal.

With such a radar sensor 107, the distance of the bulk good within a certain sector 110 could be determined angularly-resolved as a function of time. In this way, it would be possible to register the contour 111 of the bulk good flowing past as a function of time. This also permits an inference of the amount of bulk good flowing by.

With such a radar sensor 107, a continuous monitoring of the respective conveyor plant or production line could be performed. For example, radar sensor 107 could turn the line off in the case of disturbances of regular operation. Moreover, the amount of a fill substance transported could be determined by means of such a radar sensor 107. Such a radar sensor 107 would be especially helpful for use in conveyor or production environments. Especially, such a radar sensor 107 could be applied as a component of process automation technology and used for the control of the production line or conveyor line.

In radar applications, in which the angular position of an object is to be determined, linear antenna arrays are frequently applied in order to determine the propagation direction of the electromagnetic waves reflected back by the objects. Such linear antenna arrays include a number m of antenna elements arranged in a row next to one another, wherein m is a natural number.

Figure 2:
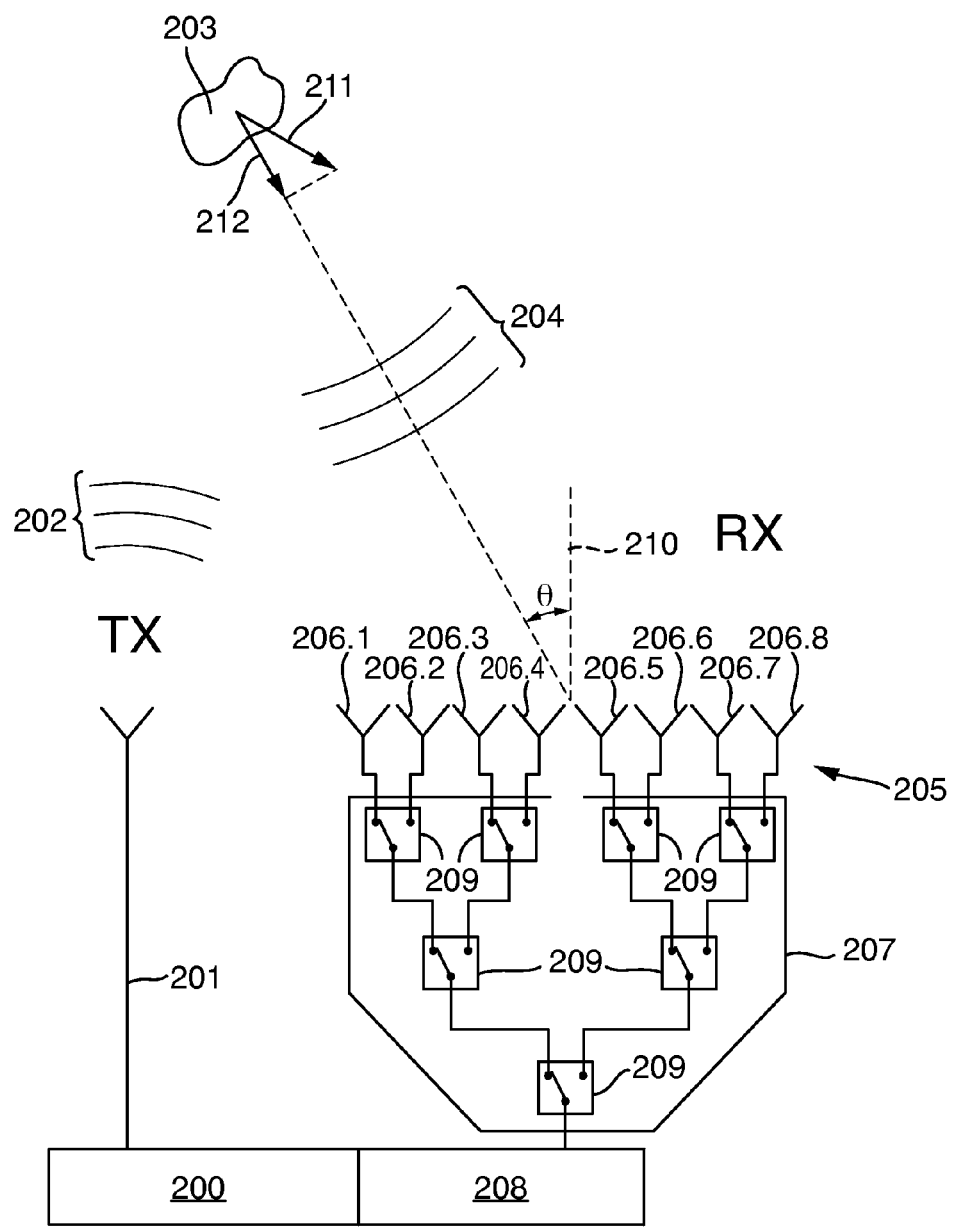
FIG. 2 is a radar apparatus with a transmitting antenna and a switched receiving antenna array.

Such a radar system is shown in FIG. 2. The transmission path of the radar system includes a transmitting unit 200 as well as a transmitting antenna 201, which radiates a radar signal 202. A reflected signal 204 is produced by reflection of radar signal 202 by a radar target 203. Reflected signal 204 is moving toward an antenna array 205.

At antenna array 205 is part of the receiving path of the radar system and includes eight antenna elements 206.1 to 206.8 arranged linearly next to one another. The distance between neighboring antenna elements is designated as L.

Reflected signal 204 is received and evaluated by antenna array 205. Preferably, antenna array 205 is a switched antenna array. This means that the antenna elements 206.1 to 206.8 are individually connected one after the other to an evaluation unit 208 by a switching unit 207 for the evaluation of the received signals. For example, each antenna element 206.1 to 206.8 can be connected to evaluation unit 208 during a switching clock period, in order, in this way, to evaluate the signal received by each antenna element. Then switching unit 207 advances to the next antenna element. In such case, the individual antenna elements 206.1 to 206.8, corresponding to their spatial arrangement, are individually connected to evaluation unit 208 one after the other either from right to left or from left to right, in order to determine the different received signals one after the other.

Switching unit 207 can be realized, for example, as a switching tree, which includes a plurality of switching elements 209. In radar technology, the individual switch elements 209 of switching unit 207 can preferably be realized with the assistance of PIN diodes.

Through the application of a switched antenna array, only a single evaluation unit 208 is required for evaluating the signals received by antenna elements 206.1 to 206.8. This solution is clearly more cost effective than when each antenna element and each receiving channel would have a separate evaluating electronics.

Radar target 203 is located at a certain angular position relative to antenna array 205. In such case, the angular position of the radar targets 203 relative to the antenna array 205 is described by the angle $\theta$ to the normal 210. As a result of this angular position of radar target 203, the wave front of reflected signal 204 is likewise inclined by the angle of inclination $\theta$ to the normal 210 of antenna array 205. Through the inclined incidence of the wave front of reflected signal 204 on antenna array 205, a phase progression is impressed on the signals received by the individual antenna elements 206.1 to 206.8. This means that a signal received by a certain antenna element has a certain phase shift compared to the signal received by the neighboring antenna element.

As long as radar target 203 is a static radar target, which does not move relative to antenna array 205, the phase progression of the signals received by the antenna elements 206.1 to 206.8 only depends on the angular position of radar target 203. In this case, the angle of incidence of the wave front of reflected signal 204 and therewith also the angular position of radar target 203 can be determined based on the phase progression.

If radar target 203 is moving relative to antenna array 205 with a velocity 211 as shown in FIG. 2, this also contributes to the phase progression. Velocity 211 includes a radial velocity component 212 in the direction of antenna array 205. This radial velocity component 212, which is primary in phase considerations, is also referred to as velocity v in the following, while the angular placement of radar target 203 relative to antenna array 205 is described by the angle $\theta$ to normal 210.

For the case of a moving radar target 203, one receives, in the evaluation of the signals received by antenna elements 206.1 to 206.8, a phase progression, which has an angularly dependent phase contribution and a phase contribution caused by radial velocity v. The velocity dependent contribution arises, because radar target 203 always is moving toward the antenna elements during the switching of the antenna elements and therefore causes an additional phase contribution. In this respect, the velocity dependent contribution arises through the interaction of radial velocity component 212 of radar target 203 with the sequential further switching of the antenna elements from left to right, because radar target 203 always is moving toward antenna array 205 during the switching of the antenna elements.

Figure 3:
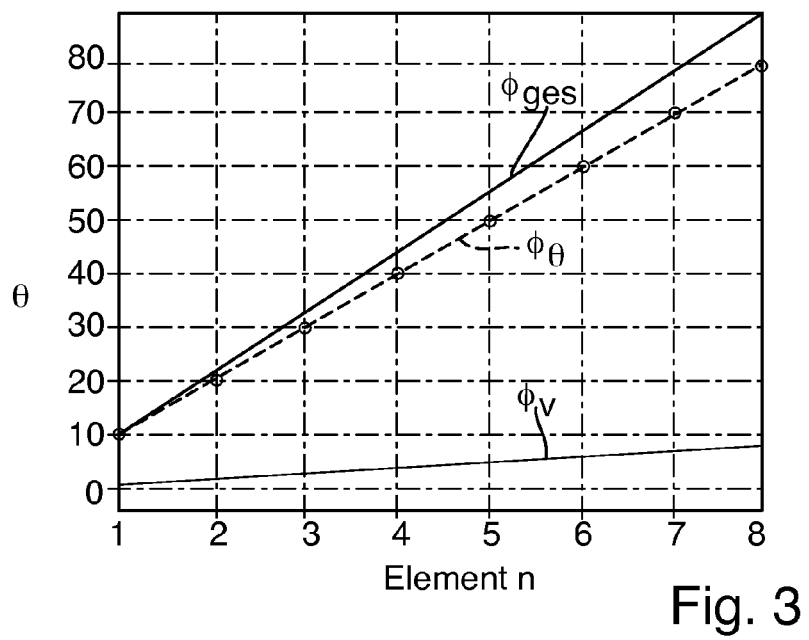
FIG. 3 is a representation of the angularly dependent part and the velocity dependent part of the phase progression detected by the receiving antenna array.

FIG. 3 shows the entire phase progression for the antenna elements, wherein the different phase contributions for the eight antenna elements 206.1 to 206.8 are plotted from left to right. The inclined incidence of the wave front causes an angle dependent phase progression $\Phi_\theta$, which is shown in FIG. 3 as a dashed line. Additionally, radial velocity v causes a velocity dependent phase progression $\Phi_v$, which likewise linearly increases for the case where the antenna elements are evaluated one after the other from left to right. The angle dependent linear phase progression $\Phi_\theta$ and the velocity dependent linear phase progression $\Phi_v$ superimpose to yield a total phase progression $\Phi_{tot}$ on the signals received by the antenna elements. This total phase progression $\Phi_{tot}$ is also shown in FIG. 3. Through evaluation of the antenna signals in the receiving path, the entire phase progression $\Phi_{tot}$ can indeed be determined; however, one still does not know how large the angle dependent part $\Phi_\theta$ is or how large the velocity dependent part $\Phi_v$ is.

A basic goal for the forms of embodiment of the present invention is, consequently, to separately determine velocity v of a target and angular placement θ of a target. In such case, for determining the angular placement, a switched antenna structure is applied, which enables simultaneous registration of two sets x and y of received signals. Based on these two sets of received signals, the angular position θ of the targets can then be determined with the assistance of the "ESPRIT" method described in the literature. The acronym "ESPRIT" stands for "Estimation of Signal Parameters via Rotational Invariance Techniques".

A detailed description of the ESPRIT method is found in the following articles;

Roy, R. et al. "ESPRIT—A Subspace Rotation Approach to Estimation of Parameters of Cisoids in Noise." *IEEE Transactions on Acoustics, Speech, and Signal Processing* vol. ASSP-34, No. 5, October 1986;

Paulraj, A. "Estimation of Signal Parameters via Rotational Invariance Techniques—ESPRIT" *Nineteenth Asilomar Conference on Circuits, Systems and Computers*, 1986 pp. 83-89; and Paulraj, A. et al. "A Subspace Rotation Approach to Signal Parameter Estimation" *Proceedings of the IEEE*, vol. 74, no. 7, July 1986;

which are herewith incorporated into the description of this patent application by reference. The essential steps of the ESPRIT method described in these articles are explained in greater detail below under the heading "Description of the ESPRIT Method". For a more detailed presentation, reference is additionally made to the three articles cited above.

Figure 4A:
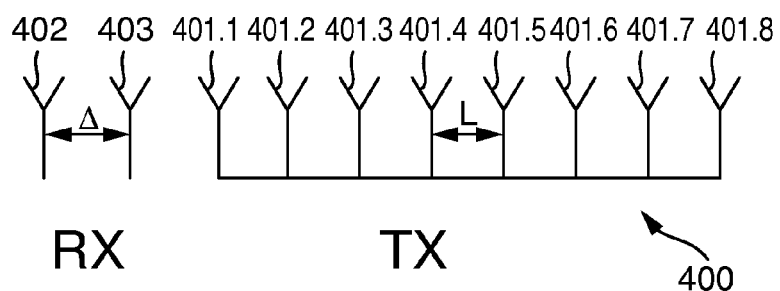
FIG. 4A is an antenna arrangement of the invention having a switched transmission antenna array and two receiving antennas.

In the forms of embodiment of the present invention, the radar measurement is performed with the assistance of an antenna structure, as schematically presented in FIG. 4A. The transmission side of the antenna structure of the invention, which is marked "TX" in FIG. 4A, includes a switched linear transmission antenna array 400 with eight antenna elements 401.1 to 401.8 arranged next to one another. Antenna elements 401.1 to 401.8 are arranged linearly next to one another at a constant distance from one another, wherein the distance between neighboring antenna elements is designated as L. The distance L between neighboring antenna elements should be selected to be smaller than λ/2, wherein λ is the wavelength of the radar signal used. Through such a choice of distance L between neighboring antenna elements, it is possible to largely prevent ambiguities in the association and evaluation of the radar signals. Transmission antenna array 400 is a switched antenna. This means that the different antenna elements 401.1 to 401.8 are individually connected to the transmission path one after the other, in order to then radiate its transmission signal during a switching clock interval.

The receiving side of the antenna structure shown in FIG. 4A, marked "RX", includes two receiving antennas 402 and 403 for the simultaneous reception of the radar signals transmitted by switched transmission antenna array 400 and reflected by one or more targets. The two receiving antennas 402, 403 are arranged at a distance Δ from one another. It is important that both antenna elements 402, 403 in the receiving path can both simultaneously receive signals. For example, a separate receiving path with separate evaluating electronics can be provided for each of the two receiving antennas 402, 403. Each of the two receiving antennas 402, 403 simultaneously receives the reflected signals from the different targets of the radar signals radiated by the individual antenna elements of transmission antenna array 400 one after the other.

Figure 4B:
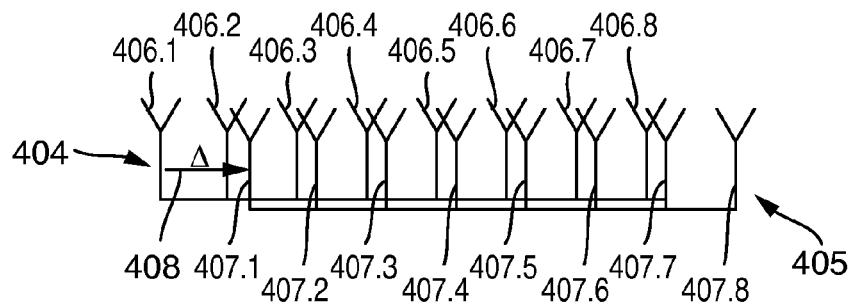
FIG. 4B is an arrangement of two receiving antenna arrays, which are shifted relative to one another, and which are equivalent to the antenna arrangement of FIG. 4A.

FIG. 4B shows an antenna structure having two identical receiving antenna arrays 404 and 405 shifted relative to one another; the antenna structure of FIG. 4B is equivalent to the antenna structure shown in FIG. 4A. The structure shown in FIG. 4B having two receiving antenna arrays shifted relative to one another has an aperture equivalent to the structure shown in FIG. 4A. The first receiving antenna array 404 includes eight receiving antenna elements 406.1 to 406.8 arranged linearly alongside one another, wherein the distance between neighboring antenna elements is designated as L. The second receiving antenna array 405 likewise includes eight receiving antenna elements 407.1 to 407.8 arranged linearly next to one another, wherein the distance between neighboring antenna elements is again designated L. Second receiving antenna array 405 is shifted a distance Δ relative to first receiving antenna array 404, thus the same distance between the two receiving antennas 402 and 403 in FIG. 4A. Second receiving antenna array 405 thus is shifted an amount Δ from the first receiving antenna array 404. This shift is illustrated by the shift vector 408 in FIG. 4B.

The formation of the equivalent antenna structure shown in FIG. 4B can be understood in the following way: The first equivalent receiving antenna array 404 results from the cooperation of first receiving antenna 402 with switched transmission antenna array 400, while second equivalent receiving antenna array 405 results from the cooperation of second receiving antenna 403 with switched transmission antenna array 400.

This cooperation between receiving antennas 402, 403 and transmission antenna array 400 can be mathematically represented by a convolution, in which the arrangement of receiving antennas 402, 403 is convoluted with the arrangement of antenna elements 401.1 to 401.8 of transmission antenna array 400 in position space. In such case, receiving antennas 402, 403 arranged a distance Δ from one another can be presented as a sum of two Dirac pulses spaced relative to one another. Correspondingly, transmission antenna array 400 can be presented as a sum of eight Dirac pulses equidistantly arranged next to one another at distances L. When the sum of Dirac pulses, which represents receiving antennas 402, 403, is convoluted with the sum of Dirac pulses, which corresponds to transmission antenna array 400, the result of this convolution in position space is the equivalent structure, which has two receiving antenna arrays 404, 405 shifted relative to one another by distance Δ, shown in FIG. 4B.

Required for application of the ESPRIT method is the simultaneous registration of reflected radar signals by two identical, but shifted relative to one another, receiving antenna arrays. As is to be seen based on the equivalent structure shown in FIG. 4B, the full extent of these requirements are fulfilled by the antenna structure of FIG. 4A. An antenna structure, which includes a switched transmission antenna array 400 in connection with two simultaneously operating receiving antennas 402, 403, is thus optimally suited for application of the ESPRIT method.

Figure 5:
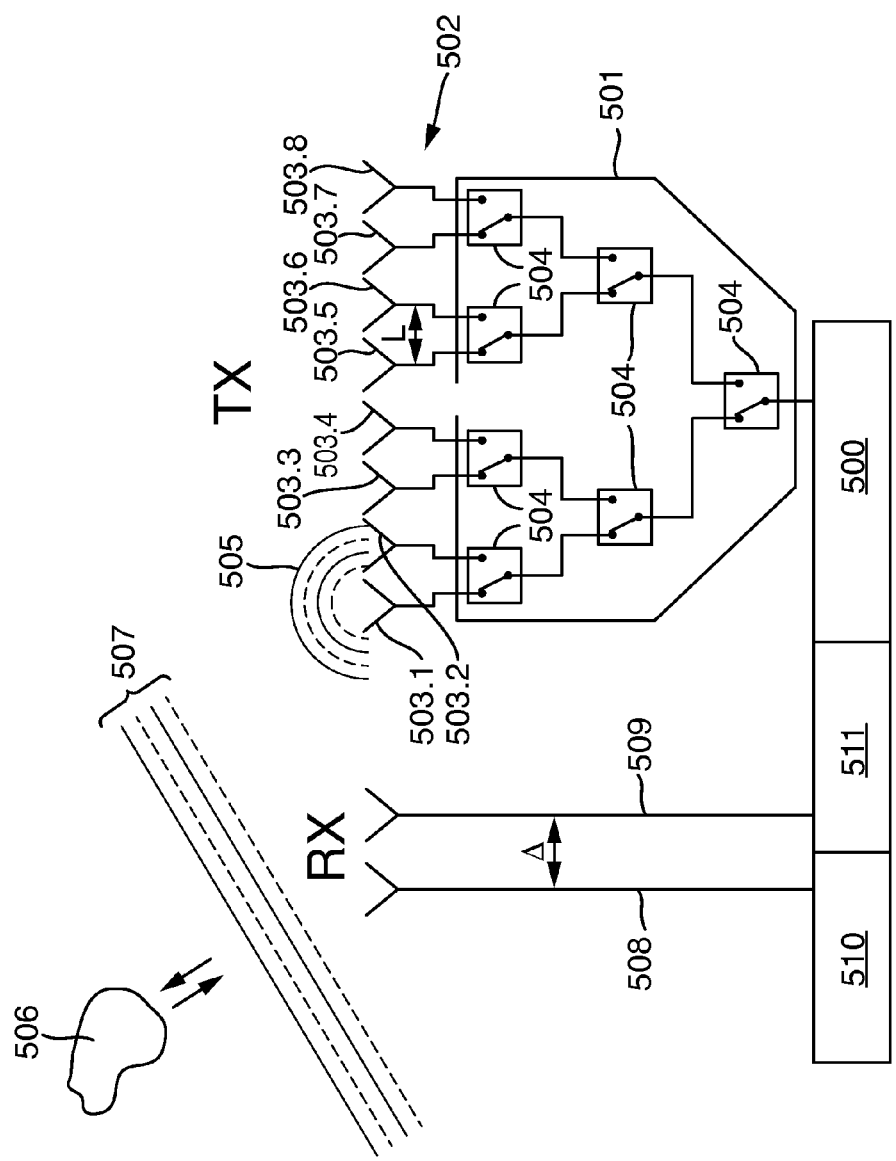
FIG. 5 is a detailed representation of the antenna arrangement of the invention having a switched transmission antenna array and two receiving antennas.

FIG. 5 shows implementation of a radar system, which has the antenna structure shown schematically in FIG. 4A. The transmission path of the radar system shown in FIG. 5 includes a transmitting unit 500, which is designed to produce transmission signals and to deliver the transmission signals to a switched transmission antenna array 502 via a switching unit 501. Transmission antenna array 502 includes eight transmission antennas 503.1 to 503.8 arranged linearly next to one another at distances L; the transmission signal is fed to transmission antennas 503.1 to 503.8 in a correspondingly predetermined switching sequence one after the other by switching unit 501. In order to correspondingly connect the transmission signal through to the different antenna elements 503.1 to 503.8 one after the other in the predetermined switching sequence, switching unit 501 can be realized, for example, as a switching tree, which includes a number of switching elements 504. Corresponding to the predetermined switching sequence, the individual antenna elements 503.1 to 503.8 radiate a radar transmission signal 505 one after the other. This radiated transmission signal 505 is reflected by one or more radar targets. In FIG. 5 only one radar target 506 is drawn, however, a number of radar targets can also be present. The reflected signal 507 reflected by one or more radar targets is simultaneously received by a first receiving antenna 508 and a second receiving antenna 509. During the total switching sequence of transmission antenna array 502, the signals received by first receiving antenna 508 are evaluated by a subordinate first receiving unit 510. Correspondingly the signals recorded by second receiving antenna 509 during the switching sequence of transmission antenna array 502 are evaluated by the subordinated second receiving unit 511. At the end of the switching sequence first receiving unit 510 delivers a first set x of received signals, while second receiving unit 511 delivers a second set y of received signals registered at the same time. The two sets of received signals x and y serve as output data for application of the ESPRIT method and enable determination of the angular position of the radar target(s) independently of the respective velocity of the radar target(s).

The combination of switched transmission antenna array 400 with two receiving antennas 402, 403 operating in parallel corresponds to an equivalent arrangement, which has two equivalent receiving antenna arrays 404, 405 operated at the same time and shifted relative to one another. The properties of these two receiving antenna arrays are identical, so an application of the ESPRIT method is possible.

The phase shift between the individual antenna elements within the equivalent receiving antenna arrays 404, 405 shown in FIG. 4B is determined by the angular placement and velocity of the radar target(s) as before. However, only the phase shift between the received signals registered by first equivalent receiving antenna array 404 and the received signals registered by second equivalent receiving antenna array 405 is evaluated in the ESPRIT method. Even when the at least one radar target is moving with a velocity unequal to zero during the switching sequence of transmission antenna array 400 and thereby causes velocity dependent phase shifts of the received signals, these velocity caused phase contributions act in an equal manner on the received signals registered at the same time by the two equivalent receiving antenna arrays 404 and 405 during the switching sequence so that the relative phase relationship between the received signals registered by first equivalent receiving antenna array 404 and the received signals registered by second equivalent receiving antenna array 405 does not depend on the velocity of the radar target. Due to the simultaneous registration of the received signals by the two equivalent receiving antenna arrays 404 and 405 only the angular placement of the target or targets is addressed, so the angular placement of the target or targets can be determined separately by means of the ESPRIT method independently of the velocity of the target or targets. Consequently, it is essential for the forms of embodiment of the present invention that the antenna structure shown in FIG. 4A, in spite of an application of a switched transmission antenna array, enables a simultaneous registration of two sets of received signals x and y, whose phase progression is influenced in an equal manner by the switching through of the transmission antenna array, so that the relative phase relationship between the set x of received signals received by first receiving antenna 402 and the set y of received signals received by second receiving antenna 403 allows an isolated determination of the angular placement by application of the ESPRIT method, and, indeed, independently of the respective velocity of the target(s). The angle measurement can be performed, consequently, independently of the velocity with the assistance of the antenna arrangement shown in FIG. 4A.

With the antenna structure shown in FIG. 4A and FIG. 5, consequently, the angular placement of moving objects can be determined, wherein the ESPRIT method is used for evaluation. Therefore, this antenna structure is especially suited for applications in the area of monitoring conveyor or production lines, in which tracking moving objects plays an essential role.

Corresponding to an advantageous form of embodiment of the invention, the ESPRIT method is used in combination with FMCW radar. In FMCW (Frequency Modulation Continuous Wave) radar, a saw tooth shaped or triangular frequency modulation is used in order to ascertain the distances of the radar targets from the radar apparatus. In this regard, the space before the radar apparatus is divided into different range cells, and for each radar target, it is ascertained in which range cell the concerned target is located. Then, in a following step, the angular position of the targets can be ascertained by means of the ESPRIT method. For this, it is advantageous, to apply the ESPRIT method separately for the targets located in a certain range cell. In this way, it is possible to determine both the distance of the targets as well as the angular placement of the targets through the combination of FMCW radar and the ESPRIT method. However, the ESPRIT method can also be applied with pulse radar.

The antenna structure of the invention shown in FIG. 4A and FIG. 5 is well suited for a combined application of FMCW radar and the ESPRIT method. The frequency modulated signals serve to determine distance, while the ESPRIT method is applied to determine the angular position. Therefore, both the distance as well as the angular placement of moving objects can be determined with the assistance of the antenna arrangement of the invention. The antenna structure shown in FIG. 4A and FIG. 5 is suited, consequently, for monitoring conveyor or production environments, in which the position of moving objects must be determined. For example, the conveyor belt shown in FIG. 1 and the bulk good located thereon could be monitored by means of a radar sensor, which has an antenna structure in accordance with FIG. 4A and FIG. 5. Also with moving objects, as especially occurs in applications in the area of conveyor technology, an evaluation by means of FMCW and ESPRIT enables a reliable determination of the angular position of the moving objects. This enables the position of the moved objects to be followed continuously.

Figure 6A:
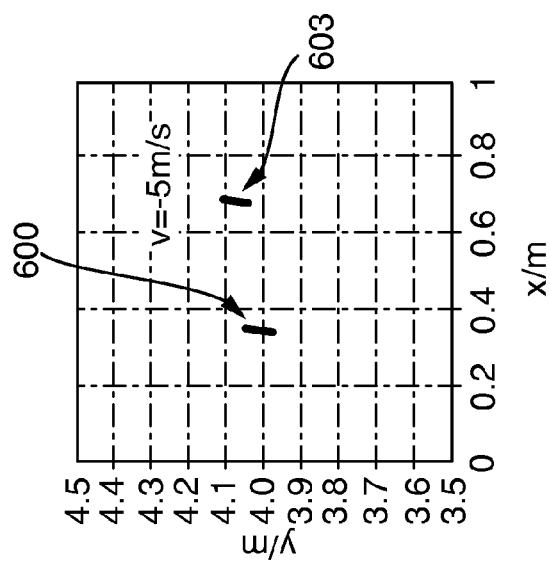
FIGS. 6A-6C shows the angular placements and distances for a static radar target and for a moving radar target, wherein the angular placements were determined by means of the ESPRIT method.
Figure 6B:
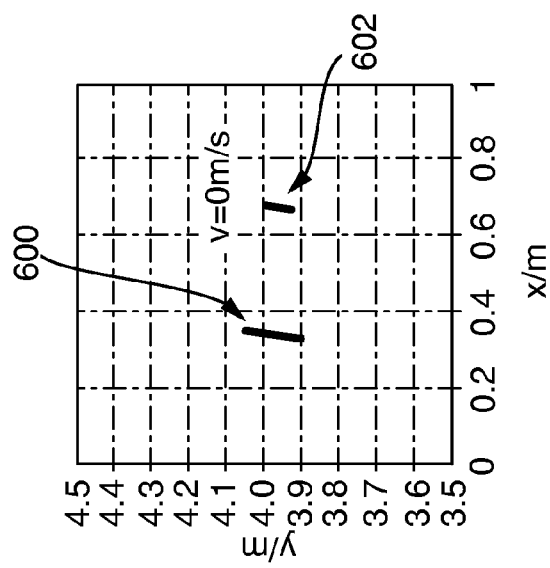
Figure 6C:
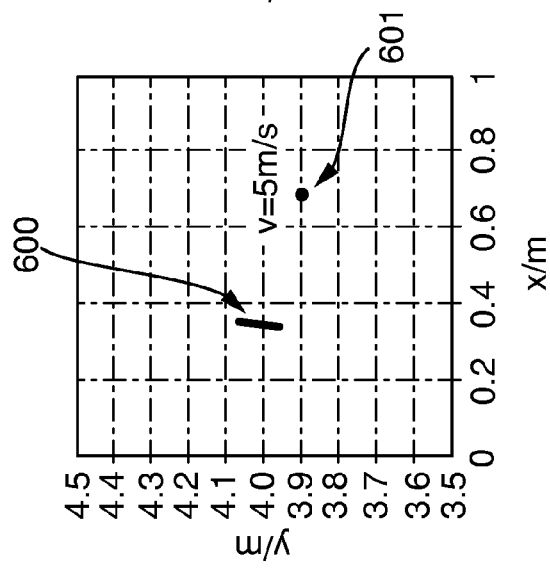

FIGS. 6A, 6B, 6C show that the angular position of the targets, even moving targets, can be correctly determined by means of the ESPRIT method. Simulation results of an unmoving target and a moving target are shown in FIG. 6A, 6B, 6C. FIG. 6A shows a stationary target 600 and a target 601 moving with a velocity of 5 m/s relative to the radar apparatus. FIG. 6B shows stationary target 600 and a moving target 602 now at rest. FIG. 6C shows stationary target 600 and a moving target 603 with a velocity of −5 m/s relative to the radar apparatus. It is recognizable that the angular placement can be correctly determined independent of the velocity.

The velocity of the moving objects can also be determined in addition to the determination of distance and angular position. Ascertaining the velocity can happen in a number of ways. In the case of FMCW radar, even triangle shaped modulation forms can be used to determine the distance to a target. By repeatedly measuring the distance and angular position it is possible to determine the velocity of the target.

Alternatively, the velocity can be determined by means of the ESPRIT method. In such case, for example, time shifted array portions can also be evaluated supplementally to the spatially shifted array portion. The result then includes the contributions of velocity and angular placement.

Alternatively, measurement using the ESPRIT method can be performed at two different points in time. The evaluation from ESPRIT then delivers the velocity of the target.

The radar sensor of the invention can be applied in different applications to monitor conveyor and production lines. A first example has already been described based on FIG. 1, where a radar sensor of the invention was applied to monitor a conveyor belt.

Figure 7A:
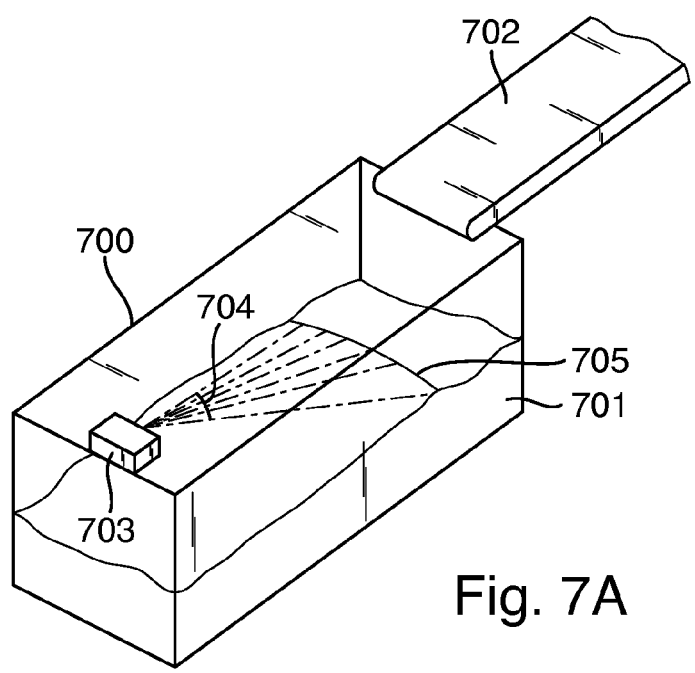
FIGS. 7A, 7B are two applications of the method of the invention in the case of registering the fill level in a container.

Another application of a radar sensor of the invention is described based on FIG. 7A. FIG. 7A shows how a radar sensor is applied to monitor the fill level of a container. The container 700 is partially filled with bulk good 701 and is further filled with bulk good by a continuous conveyor 702. For determining the fill level in container 700, a radar sensor 703 is provided, which determines the distance to the bulk good within the angular range 704 as a function of angle. Based on the distance line 705 so determined, the fill level in container 700 can be deduced. Radar sensor 703 can be embodied as a component of process automation technology and can be applied to control continuous conveyor 702.

Figure 7B:
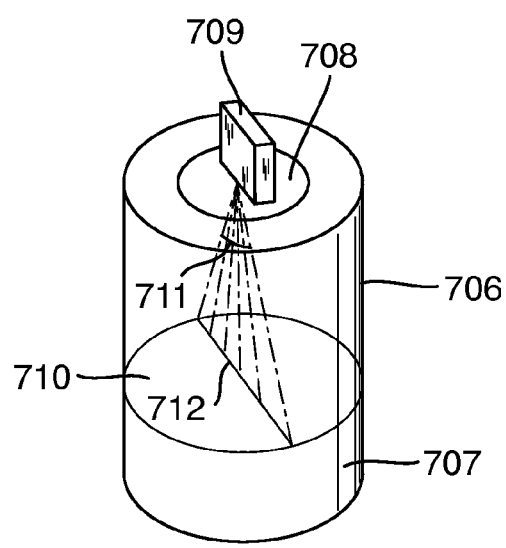

FIG. 7B shows a further example, in which a radar sensor is applied to determine the fill level in a tank. The tank 706 is filled with a liquid 707. Placed in the lid 708 of tank 706 is a radar sensor 709, which is embodied to determine the distance of the liquid upper surface 710. The radar sensor 709 of the invention determines the distance of liquid upper surface 710 as a function of angle using the ESPRIT method. Within the angular range 711, the progression of liquid upper surface 710 can be ascertained. In this way, a line 712 is determined, which describes the distance from radar sensor 709 to liquid upper surface 710. Based on this line 712, the fill level in tank 706 can be very precisely ascertained, and, indeed, even when radar sensor 709 is not exactly arranged perpendicularly to liquid upper surface 710, but, instead tilts slightly.

Description of the ESPRIT-Method

A detailed description of the ESPRIT method is found in the following articles:

Roy, R. et al., "ESPRIT—A Subspace Rotation Approach to Estimation of Parameters of Cisoids in Noise", *IEEE Transactions on Acoustics, Speech, and Signal Processing*, Vol. ASSP-34, No. 5, October, 1986;

Paulraj, A. "Estimation of Signal Parameters via Rotational Invariance Techniques—ESPRIT", *Nineteenth Asilomar Conference on Circuits, Systems and Computers*, 1986, pp. 83-89; and Paulraj, A. et al., "A Subspace Rotation Approach to Signal Parameter Estimation", *Proceedings of the IEEE*, vol. 74, No. 7, July, 1986;

which are herewith incorporated into the description of this patent application by reference. The essential steps of the ESPRIT method described in these articles are explained below, wherein reference is made to the three articles named above for a detailed presentation.

Geometrical Starting Situation for Application of the ESPRIT Method

The ESPRIT method serves for the determination of each angular position of d different radar targets, wherein d is a natural number. In such case, the evaluation of the radar signals reflected by the d radar targets occurs with the assistance of two receiving antenna arrays shifted relative to one another, but otherwise identical.

Figure 8:
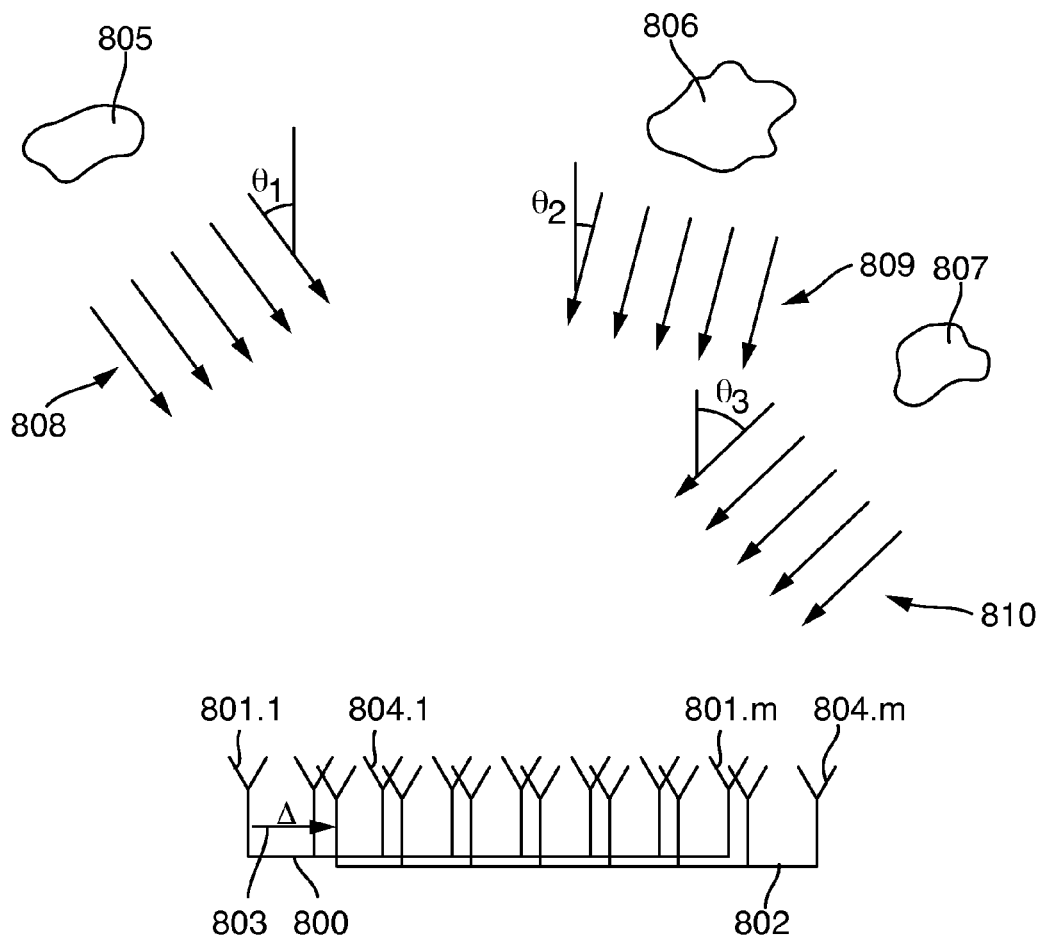
FIG. 8 is a representation of the radar arrangement required for application of the ESPRIT method.

An ESPRIT measuring arrangement for d=3 different radar targets is shown in FIG. 8. The measuring arrangement includes a first receiving antenna array 800, which in the following is also referred to as "receiving antenna array X". This first receiving antenna array 800 includes m different receiving antennas 801.1 to 801.$m$ arranged alongside one another, and these m receiving antennas receive the received signals $x_1 \ldots x_m$. The second receiving antenna array 802 is shifted a distance $\Delta$ from first receiving antenna array 800. This is illustrated in FIG. 8 by the shift vector 803. The second receiving antenna array 802, which in the following is referred to as "receiving antenna array Y", is identical to the first receiving antenna array 800 and likewise includes, consequently, m receiving antennas 804.1 to 804.$m$ arranged next to one another. The m received signals $y_1 \ldots y_m$ are received by the m receiving antennas 804.1 to 804.$m$.

A radar wave emitted by the radar sensor is reflected by the three radar targets 805, 806 and 807 shown in FIG. 8, and the three reflected wave fronts 808, 809, 810 produced thereby move in the direction of the two receiving antenna arrays 800, 802 and are received there. In such case, the three reflected wave fronts impinge on the two receiving antenna arrays 800, 802 at different angles. The first wave front 808 impinges on the two arrays at an angle $\theta_1$ (measured from the normal), the wave front 809 impinges on the two arrays at an angle $\theta_2$, and the third wave front 810 impinges on the two arrays at an angle $\theta_3$. In such case, the respective angle $\theta_1, \theta_2, \theta_3$, at which wave fronts 808, 809, 810 impinge on the two receiving antenna arrays 800, 802, corresponds to the respective angular placements of the radar targets 805, 806, 807.

The goal of the evaluation by means of the ESPRIT method is to determine the respective angular placements $\theta_1, \theta_2 \ldots \theta_d$ for d different radar targets based on the received signals delivered by the two receiving antenna arrays 800 and 802.

Various basic assumptions are made for performing the ESPRIT method. First, it is assumed that radar targets 805, 806, 807 are at sufficiently large distances from the two receiving antenna arrays 800, 802, such that the wave fronts impinging on the receiving antenna arrays are essentially planar wave fronts. Another assumption is that the particular angular position of radar targets 805, 806, 807 is defined by a single parameter, namely the azimuth angle θ. Another proviso for application of the ESPRIT method is that the number m of antenna elements in each receiving antenna array 800, 802 is larger than the number d of radar targets, thus it must hold that m>d. Another proviso for application of the ESPRIT method is that the radar signals are narrowband radar signals. In this connection, narrowband means that the signal bandwidth is small compared to the reciprocal of the time period required for a wave front to pass the receiving antenna array. In this respect, frequency modulated radar signals corresponding to the FMCW (Frequency Modulated Continuous Wave) principle having, for example, a saw tooth shaped or triangular frequency modulation, are considered "narrowband" in the sense of the definition above to the extent that the frequency modulation occurs sufficiently slowly.

The signals $x_1 \ldots x_m$ received by first receiving antenna array 800, the receiving antenna array X, can be represented as:

$$x_i = \sum_{k=1}^{d} s_k \cdot a_i(\theta_k) + n_{xi}, \text{ with } i = 1, \ldots, m$$

and the signals $y_1 \ldots y_m$ received by second receiving antenna array 802, the receiving antenna array Y, can be represented as:

$$y_i = \sum_{k=1}^{d} s_k \cdot e^{i\omega_0 \Delta \sin\theta_k/c} \cdot a_i(\theta_k) + n_{yi}, \text{ with } i = 1, \ldots, m$$

In such case, $s_k$ refers to the radar signal reflected by the k-th radar target, as received by the first antenna element of the first receiving antenna array 800. The first antenna element thus serves as a reference antenna element. The angle $\theta_k$ refers to the angular position of the k-th radar target relative to the normal. The coefficient $a_i(\theta_k)$ relates the received signal of the i-th antenna element to the received signal from the first antenna element of a receiving antenna array when the wave front strikes at an angle $\theta_k$ to the normal.

In the received signals $y_1 \ldots y_m$ of the second receiving antenna array 802 (receiving antenna array Y) additional phase factors arise within the summing over the different wave fronts:

$$e^{i\omega_0 \Delta \sin\theta_k/c}$$

These additional phase factors are caused by the shift Δ between the first receiving antenna array 800 and the second receiving antenna array 802. In these phase factors, $\omega_0$ represents the center frequency of the radar signal, Δ the magnitude of the shift vector 803 between the first receiving antenna array 800 and the second receiving antenna array 802, and c the propagation velocity of the radar signals in the respective transmission medium.

In order to correctly represent the received signals, additional additive noise terms $n_{x1} \ldots n_{xm}$ are included in received signals $x_1 \ldots x_m$ of the first receiving antenna array. Likewise, additive noise terms $n_{y1} \ldots n_{ym}$ are included in the received signals $y_1 \ldots y_m$.

For each of the two receiving antenna arrays, the received signals can also be presented in vector notation:

$$x = A \cdot s + n_x$$

$$y = A \cdot \Phi \cdot s + n_y$$

In such case, the vector x refers to the (m×1) vector of the received signals of receiving antenna array X, while the vector y refers to the (m×1) vector of the received signals of receiving antenna array Y:

$$x^T = [x_1, \ldots x_m]$$

$$y^T = [y_1, \ldots y_m]$$

The vector $n_x$ refers to the (m×1) vector of the noise signal for receiving antenna array X, while the vector $n_y$ refers to the (m×1) vector of the noise signal of receiving antenna array Y:

$$n_x^T = [n_{x1}, \ldots n_{xm}]$$

$$n_y^T = [n_{y1}, \ldots n_{ym}]$$

The vector s is a (d×1) vector of the d different impinging wave fronts, as observed by the first antenna element of receiving antenna array X:

$$s^T = [s_1, \ldots s_d]$$

The coefficients $a_i(\theta_k)$, with 1≤i≤m, 1≤k≤d form the (m×d) matrix A, which is also referred to as a direction matrix. The column vectors $\{a(\theta_k), k=1 \ldots, d\}$ of matrix A specify, in such case, how a wave front, which strikes a receiving antenna array at an angle $\theta_k$, affects the individual antenna elements of the receiving antenna array.

The matrix Φ is a diagonal (d×d) matrix, whose diagonal elements represent the phase shift between the two receiving antenna arrays X and Y for d different wave fronts. Matrix Φ can be written as:

$$\Phi(t) = \text{diag}[e^{i\phi_i}, \ldots, e^{i\phi_d}] \text{ with } \phi_k = \omega_0 \cdot \Delta \cdot \sin\theta_k/c$$

Matrix Φ is a unitary matrix, which establishes a relationship between the measurements of receiving antenna array X and the measurements of receiving antenna array Y. Each diagonal element of matrix Φ affects an additional phase rotation $e^{i\phi_k}$, therefore matrix θ is referred to as a rotation matrix in the following.

The autocorrelation matrix $R_{xx}$ of the received signals x of receiving antenna array X yields an expectation value of the correlation of the received signals x with itself. Autocorrelation matrix $R_{xx}$ can be presented as:

$$R_{xx} = E[x \cdot x^*] = E[(A \cdot s + n_x) \cdot (A \cdot s + n_x)^*] = ASA^* + \sigma^2 \cdot I$$

In this formula E[ . . . ] refers to the expectation value of the variables contained within the square brackets, A* stands for the conjugate transpose of matrix A, and I refers to the unit matrix. Matrix S is a (d×d) correlation matrix of the vector s of the incoming signals, which is calculated as follows:

$$S = E[s \cdot s^*]$$

The value $\sigma^2$ refers to the level of the additive white noise, which arises in all antenna elements.

The cross correlation matrix $R_{xy}$ yields an expectation value of the correlation of the received signals x with the received signals y. Cross correlation matrix $R_{xy}$ can be represented as:

$$R_{xy} = E[x \cdot y^*] = E[(A \cdot s + n_x) \cdot (A \cdot \Phi \cdot s + n_y)^*] = AS\Phi^* A^*$$

In such case, A* again refers to the conjugate transpose of matrix A. The matrix Φ* is the conjugate transpose of matrix Φ, in which each diagonal element of Φ is replaced by the corresponding complex conjugate diagonal element.

A basic idea of the ESPRIT method is to utilize the rotational invariance of the underlying signal subspaces; this rotation invariance is brought about by the translation invariance of the receiving antenna array.

In this regard, autocorrelation matrix $R_{xx}$ is considered first:

$$R_{xx} = ASA^* + \sigma^2 \cdot I$$

$R_{xx}$ is an (m×m) matrix. To determine the eigenvalues of $R_{xx}$, first the component $ASA^*$ is considered. First, it should be shown that the rank of $ASA^*$ is equal to d. From this it follows that:

$$\rho(ASA^*) = \min(\rho(A), \rho(S))$$

wherein $\rho(\ldots)$ refers to the rank of the matrix argument in the round brackets. The columns of the (m×d) matrix A are linearly independent, and therefore $\rho(A)=d$. Moreover, $\rho(S)=d$ because the (d×d) matrix S is not singular. In the formula above, the rank of the (m×m) matrix $ASA^*$, consequently, is equal to d. Matrix $ASA^*$ has, consequently, d eigenvalues, which are nonzero. The residual (m–d) eigenvalues of matrix $ASA^*$ are equal to zero.

Next the (m×m)-matrix $R_{xx}$ is again considered:

$$R_{xx} = ASA^* + \sigma^2 \cdot I$$

Since matrix $ASA^*$ possesses a number of (m–d) eigenvalues equal to zero, matrix $R_{xx} = ASA^* + \sigma^2 \cdot I$ possesses a number of (m–d) eigenvalues, which all equal $\sigma^2$ and, consequently, are essentially determined by the amplitude of the noise. When the m eigenvalues of $R_{xx}$ are ordered according to size, thus $\lambda_1 > \lambda_2 > \ldots > \lambda_m$, then:

$$\lambda_{d+1} = \ldots = \lambda_m = \sigma^2$$

In this respect, the (m–d) smallest eigenvalues of $R_{xx}$ are determined by noise level $\sigma^2$ present in the antenna elements.

The matrix bundle $$C_{xx} - \gamma \cdot R_{xy}$$

is considered for determining the eigenvalues $\lambda_1, \lambda_2 \ldots \lambda_d$. In such case, $C_{xx} = R_{xx} - \sigma^2 \cdot I$ is autocorrelation matrix $R_{xx}$ reduced by the noise fraction $\sigma^2 \cdot I$. Consequently:

$$C_{xx} = R_{xx} - \sigma^2 \cdot I = ASA^*.$$

Matrix $C_{xx}$, consequently, is equal to the noise independent part $ASA^*$ of autocorrelation matrix $R_{xx}$. Thus, the matrix bundle becomes:

$$C_{xx} - \gamma \cdot C_{xy} = ASA^* - \gamma \cdot AS\Phi^* A^* = AS(I - \gamma \cdot \Phi^*)A^*$$

The column spaces of both matrices $ASA^*$ and $AS\Phi^* A^*$ are identical. The rank $\rho(ASA^* - \gamma \cdot AS\Phi^* A^*)$ is generally equal to d. However, for $\gamma = e^{i\omega_0 \Delta \sin \theta_i/c}$, the i-th row of $(I - e^{i\omega_0 \Delta \sin \theta_i/c} \cdot \Phi^*)$ is equal to zero, and, consequently, the case of these special values yields:

$$\rho(I - e^{i\omega_0 \Delta \sin \theta_i/c} \cdot \Phi^*) = d - 1$$

Therefore, the special values $$\lambda_k = e^{i\omega_0 \Delta \sin \theta_i/c} \text{ with } k = 1, \ldots, d$$

are the d generalized eigenvalues of the matrix pair $(ASA^*, AS\Phi^* A^*)$. These d generalized eigenvalues are equal to the diagonal elements $\Phi_{kk} = e^{i\phi_k}$ of rotation matrix $\Phi$, with $k = 1 \ldots d$. From these d generalized eigenvalues of matrix pair $(ASA^*, AS\Phi^* A^*)$, consequently, the angular placement of the d radar targets are determined with:

$$\theta_k \arcsin(c\phi_k / \omega_0 \Delta) \text{ with } k = 1, \ldots, d$$

In summary, the following solution thus results for the generalized eigenvalue problem for matrix pair $(ASA^*, AS\Phi^* A^*)$:

the d largest generalized eigenvalues $\lambda_1 \ldots \lambda_d$ lie on the unit circle and are equal to the diagonal elements of rotation matrix $\Phi$; and the (m–d) smallest remaining generalized eigenvalues lie near the origin and are essentially determined by the noise in the antenna elements.

Presentation of the Essential Steps of a Variant of ESPRIT

The essential steps according to a variant of the ESPRIT method are:

1. Using the received signals x and y to determine the correlation coefficients $r_0, r_1, r_2 \ldots r_m$ and constructing autocorrelation matrix $R_{xx}$ and the cross correlation matrix $R_{xy}$ from these correlation coefficients;
2. determining the eigendecomposition of autocorrelation matrix $R_{xx}$, where for m>d, the lowest eigenvalue is equal to noise level $\sigma^2$;
3. determining the matrix pair $(C_{xx}, C_{xy}) = (ASA^*, AS\Phi^* A^*)$ using noise level $\sigma^2$ determined in the preceding step;
4. The d generalized eigenvalues of matrix pair $(C_{xx}, C_{xy}) = (ASA^*, AS\Phi^* A^*)$ determine the subspace rotation operator $\Phi$; the remaining (m–d) generalized eigenvalues are near zero.

In the following description of this variant of the ESPRIT method it is assumed that the two receiving antenna arrays X and Y are shifted exactly one antenna element relative to one another. It is thus assumed that the distance $\Delta$ between the receiving antennas is equal to the distance L between neighboring transmission antennas of the transmission antenna array. As a result of this overlap of exactly one antenna element between the two receiving antenna arrays X and Y, the received signal vectors x and y are:

$$y_k = x_{k+1} \text{ for } k = 1 \ldots m$$

$$x^T [x_1, \ldots, x_m]$$

$$y^T = [y_1, \ldots, y_m] = [x_2, \ldots, x_m, x_{m+1}]$$

1. Using the Received Signals x and y to Determine the Correlation Coefficients $r_0, r_1, r_2 \ldots r_m$ and Constructing Autocorrelation Matrix $R_{xx}$ and Cross Correlation Matrix $R_{xy}$ from these Correlation Coefficients The autocorrelation matrix $R_{xx}$ is defined as the expectation value of $x \cdot x^*$ $$R_{xx} E[x \cdot x^*]$$

In such case, $E[\ldots]$ refers to the expectation value. The variable $x \cdot x^*$ within the square brackets can be represented as:

$$x \cdot x^* = \begin{bmatrix} x_1 \\ x_2 \\ \vdots \\ x_m \end{bmatrix} \cdot [x_1^*, x_2^*, \ldots, x_m^*]$$

$$= \begin{bmatrix} x_1 \cdot x_1^* & x_1 \cdot x_2^* & \ldots & x_1 \cdot x_m^* \\ x_2 \cdot x_1^* & \ddots & & \vdots \\ \vdots & & \ddots & x_{m-1} \cdot x_m^* \\ x_m \cdot x_1^* & \ldots & x_m \cdot x_{m-1}^* & x_m \cdot x_m^* \end{bmatrix}$$

Thus, autocorrelation matrix $R_{xx} = E[x \cdot x^*]$ is the expectation value of this matrix $x \cdot x^*$.

The correlation coefficients $r_0, r_1, r_2 \ldots, r_m$ refer to the expectation value of the correlation between the received signals of a first antenna element and of an antenna element shifted k antenna elements relative to the first antenna element.

The correlation coefficient $r_k$ is defined as follows:

$$r_k = E[x_p \cdot x^*_{p+k}]$$

Because of the expectation value formation, these correlation coefficients $r_k$, k=1 ... m depend only on the distance k between the correlated antenna elements.

Using these correlation coefficients $r_0, r_1, r_2 \ldots r_m$, the matrix elements of autocorrelation matrix $R_{xx}$ can be presented in the following way:

$$[R_{xx}]_{ij} = E[x_i \cdot x_j^*] = \begin{cases} r_{j-i} & \text{for } j \geq i \\ r^*_{i-j} & \text{for } j < i \end{cases}$$

For autocorrelation matrix $R_{xx}$ this results in:

$$R_{xx} = \begin{bmatrix} r_0 & r_1 & \cdots & r_{m-1} \\ r_1^* & r_0 & \cdots & r_{m-2} \\ \vdots & \vdots & \ddots & \vdots \\ r_{m-1}^* & r_{m-2}^* & \cdots & r_0 \end{bmatrix}$$

Since no time dependence exists after the range analysis, the formation of the expectation value preferably happens by averaging over the site. Each receiving antenna array X and Y has m antenna elements. Correspondingly, in a preferred form of embodiment receiving antenna arrays X and Y can each be separated into a number of shorter subarrays, wherein each subarray has fewer than m antenna elements. In this form of embodiment the expectation value is thus formed by averaging over different subarrays. This is, thus, sensible since the signals of targets having different angular placement are uncorrelated in the space domain.

The assumption for cross correlation matrix $R_{xy}$ is that the antenna arrays overlap exactly one antenna element $$R_{xy} = E[x \cdot y^*] = AS\Phi^*A^* + \sigma^2 \cdot Z$$

The additional noise term $\sigma^2 \cdot Z$ is a result of the correlation between $n_x$ and $n_y$. In such case, the matrix Z is a (m×m) matrix having ones in the first secondary diagonal and zeros in the rest.

With the correlation coefficients $r_0, r_1, r_2 \ldots r_m$, the matrix elements of $R_{xy}$ result from $$[R_{xy}]_{ij} = E[x_i \cdot x_j^*] = E[x_i \cdot x^*_{j+1}] = \begin{cases} r_{j+1-i} & \text{for } j+1 \geq i \\ r^*_{i-j-1} & \text{for } j+1 < i \end{cases}$$

The cross correlation matrix $R_{xy}$ is thus:

$$R_{xy} = \begin{bmatrix} r_1 & r_2 & \cdots & r_m \\ r_0 & r_1 & \cdots & r_{m-1} \\ \vdots & \vdots & \ddots & \vdots \\ r_{m-2}^* & r_{m-3}^* & \cdots & r_1 \end{bmatrix}$$

As soon as the correlation coefficients $r_0, r_1, r_2 \ldots r_m$ are determined, autocorrelation matrix $R_{xx}$ and cross correlation matrix $R_{xy}$ can be constructed from the correlation coefficients $r_0, r_1, r_2 \ldots r_m$.

2. Determining the Eigendecomposition of the Autocorrelation Matrix $R_{xx}$, where for m>d, the Lowest Eigenvalue is Equal to Noise Level $\sigma^2$ An eigendecomposition is performed for autocorrelation matrix $R_{xx}$ determined in the preceding step. Thus, the eigenvalues $\lambda_1, \lambda_2 \ldots \lambda_m$ and the eigenvectors $\{e_1, e_2, \ldots, e_m\}$ are determined for autocorrelation matrix $R_{xx}$.

Next, noise level $\sigma^2$ is estimated. Correspondingly, in a preferred form of embodiment, the smallest of the eigenvalues $\lambda_1, \lambda_2 \ldots \lambda_m$ are ascertained. The number m of the antenna elements of the array is larger than the number d of targets. Therefore, the smallest eigenvalue $\lambda_{min}$ corresponds to noise level $\sigma^2$, and $\sigma^2 = \lambda_{min}$.

3. Determining $(C_{xx}, C_{xy}) = (ASA^*, AS\Phi^*A^*)$ Using Noise Level $\sigma^2$ Determined in the Preceding Step Using noise level $\sigma^2$ determined in the preceding step, matrix $C_{xx}$ lessened by the noise can now be determined based on $R_{xx}$:

$$C_{xx} = R_{xx} - \sigma^2 \cdot I = ASA^*$$

Likewise matrix $C_{xy}$ lessened by the noise can be determined based on $R_{xy}$ and noise level $\sigma^2$:

$$C_{xy} = R_{xy} - \sigma^2 \cdot Z = AS\Phi^*A^*$$

In such case, the matrix Z is a (m×m) matrix with ones in the first secondary diagonal and zeros in the rest. In this way, matrix pair $(C_{xx}, C_{xy}) = (ASA^*, AS\Phi^*A^*)$ can be determined based on $R_{xx}$ and $R_{xy}$.

4. The d Generalized Eigenvalues of Matrix Pair $(C_{xx}, C_{xy}) = (ASA^*, AS\Phi^*A^*)$ Determine the Subspace Rotation Operator $\theta$; the Remaining (m−d) Generalized Eigenvalues are Near Zero Next, the angular positions of the radar targets are estimated by calculating the m generalized eigenvalues of the matrix pair $(C_{xx}, C_{xy}) = (ASA^*, AS\Phi^*A^*)$. This is a special generalized eigenvalue problem, which requires attention in order to obtain stable estimates of the generalized eigenvalues. Regarding the two matrix estimates, it is not to be expected that the subspaces spanned by the two matrix approximations are identical. Therefore, the (m−d) generalized noise eigenvalues are not exactly zero. Moreover, the d generalized signal eigenvalues do not lie exactly on the unit circle. In practice, a number d of generalized eigenvalues lie near the unit circle, while the remaining (m−d) generalized eigenvalues lie clearly within the unit circle and near the origin. The d generalized eigenvalues, which are located near the unit circle, deliver the desired estimates for the diagonal elements $\Phi_{kk} = e^{i\phi_k}$ of rotation matrix $\Phi$, wherein k=1 ... d. The angular placements of the d radar targets are obtained from the phases of the diagonal elements $\Phi_{kk} = e^{i\phi_k}$, where $\phi_k = \omega_0 \Delta \cdot \sin \theta_k / c$ $$\theta_k = \arcsin\left(\frac{c \cdot \phi_k}{\omega_0 \cdot \Delta}\right), k = 1, \ldots d$$

Figure 9:
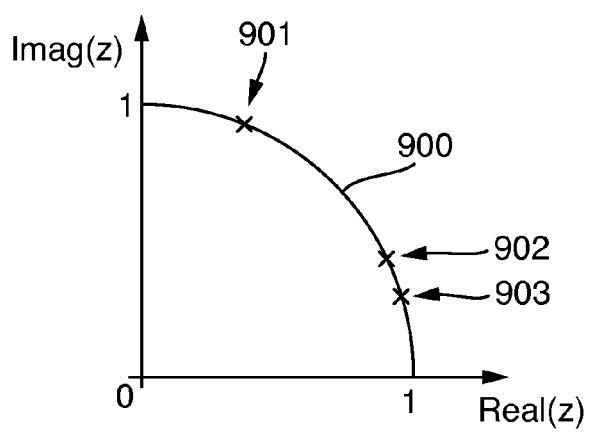
FIG. 9 shows the position of generalized signal eigenvalues in the complex plane ascertained by means of the ESPRIT method.

In the example in FIG. 9, estimates of the generalized eigenvalues for the case of d=3 radar targets are shown; the estimates were obtained by means of the ESPRIT method. Also shown in FIG. 9 is the unit circle 900. It is to be noted that the d=3 generalized eigenvalues 901, 902, 903 lie on unit circle 900. In this regard, these generalized eigenvalues 901, 902, 903 are generalized signal eigenvalues. These eigenvalues 901, 902, 903 lying on unit circle 900 are taken into consideration to determine the angular position of the three radar targets. From the respective phases of the three eigenvalues 901, 902, 903, the three angles $\theta_1, \theta_2, \theta_3$, which specify the angular positions of the radar targets, can correspondingly be determined using the formula $$\theta_k = \arcsin\left(\frac{c \cdot \phi_k}{\omega_0 \cdot \Delta}\right).$$

There are a number of alternative variants for performing the ESPRIT method in addition to the variants described above.

The invention claimed is:

1. A method for determining angular placement of at least one radar target by means of radar using an antenna arrangement, which has:
   a switched transmission antenna array with a plurality of transmission antennas, which correspondingly radiate a radar transmission signal in a predetermined switching sequence one after the other; a first receiving antenna and a second receiving antenna for receiving the radar signals radiated by the transmission antenna arrays and reflected by the at least one radar target, the method comprising the steps of:
   receiving a first set of received signals by the first receiving antenna during the switching sequence of the transmission antenna array;
   receiving, simultaneously to the receiving of the first set of received signals by the first receiving antenna, a second set of received signals by the second receiving antenna during the switching sequence of the transmission antenna array; and
   determining the angular position of the at least one radar target from the first set and the second set of received signals using an ESPRIT method.

2. The method as claimed in claim 1, wherein: two receiving antenna arrays required for a signal evaluation according to the ESPRIT method are provided in the following way:
   the switched transmission antenna array, together with the first receiving antenna, is equivalent to a first equivalent receiving antenna array; and
   the switched transmission antenna array, together with the second receiving antenna, is equivalent to a second equivalent receiving antenna array shifted relative to the first receiving antenna array.

3. The method according to claim 1, wherein:
   the radar signals are radar signals, whose bandwidth is smaller than the reciprocal of the transit time a radar signal would require to pass the transmission antenna array;
   all radar targets are assumed to be lying in a plane, wherein the azimuth angles of all radar targets relative to the antenna arrangement are determined by means of the ESPRIT method;
   the distance between the antenna arrangement and the radar targets is sufficiently large in order for the radar signals reflected by the radar targets to approach essentially as planar wave fronts; and
   the number of antenna elements of the transmission antenna array is greater than the number of radar targets.

4. The method as claimed in claim 1, further comprising the steps of:
   determining, using the ESPRIT method and based on the first set and the second set of received signals, a rotation matrix, wherein the rotation matrix is designed to transform the first set of received signals received by the first receiving antenna into the second set of received signals received by the second receiving antenna; and
   deriving the angular positions of the at least one radar target from the diagonal elements of the rotation matrix.

5. The method as claimed in claim 4, wherein:
   the rotation matrix is designed to impress additional phase shifts on the radar signals received from the at least one radar target in such a manner that the first set of received signals received by the first receiving antenna is transformed into the second set of received signals received by the second receiving antenna.

6. The method as claimed in claim 4, further comprising the steps of:
   deriving the angular positions of the at least one radar target from the diagonal elements of the rotation matrix.

7. The method as claimed in claim 1, wherein the ESPRIT method comprises:
   determining an autocorrelation matrix of the first set of received signals and a cross correlation matrix of the first and second set of received signals;
   ascertaining eigenvalues and eigenvectors of the autocorrelation matrix;
   estimating a noise level of the received signals;
   determining a first approximation matrix of rank $\hat{d}$ for the autocorrelation matrix lessened by a noise fraction and a second approximation matrix of rank $\hat{d}$ for the cross correlation matrix; and
   determining generalized eigenvalues for the two approximation matrices; and derived the angular positions of the at least one radar target from the generalized eigenvalues.

8. The method as claimed in claim 7, further comprising the steps of:
   ascertaining $\hat{d}$ generalized eigenvalues, which lie near the unit circle in the complex plane; and
   deriving the angular positions of the at least one radar target from the $\hat{d}$ generalized eigenvalues, which lie near the unit circle in the complex plane.

9. The method as claimed in claim 7, wherein by at least one of the following features applies:
   the autocorrelation matrix and the cross correlation matrix are determined from a plurality of first sets and second sets of received signals; and
   the generalized eigenvalues $\hat{d}$ located near the unit circle are diagonal elements of the rotation matrix.

10. The method as claimed in claim 1, wherein by at least one of the following features applies:
    the radar signals are frequency modulated radar signals corresponding to the FMCW principle;
    the radar signals are frequency modulated radar signals with saw tooth shaped frequency modulation or triangular frequency modulation corresponding to the FMCW principle; and
    in addition to the angular placement of the at least one radar target, distances of the at least one radar target are also ascertained by the antenna arrangement by applying frequency modulated radar signals corresponding to the FMCW principle.

11. The method as claimed in claim 1, wherein:
    the at least one radar target comprises at least one moving radar target, which is moving at a nonzero velocity relative to the antenna arrangement.

12. The method as claimed in claim 1, wherein by one of the following features applies:
    in addition to the angular positions of the at least one radar target, velocities are also ascertained, wherein the angular placements and distances of the at least one radar target are ascertained at least at two different points in time and the velocities of the at least one radar target are derived therefrom; and in addition to the angular positions of the at least one radar target, velocities are also ascertained, wherein the first set of received signals received by the first receiving antenna and the second set of received signals received by the second receiving antenna are registered at different points in time and are evaluated by means of the ESPRIT method.

13. The use of an antenna arrangement to determine the angular positions of at least one radar target, wherein the antenna arrangement comprises:

a switched transmission antenna array with a plurality of transmission antennas, each of which radiates a radar transmission signal one after the other corresponding to a predetermined switching sequence;

a first receiving antenna to receive a first set of received signals, which were radiated by said switched transmission antenna array and were reflected by said at least one radar target; and a second receiving antenna to receive a second set of received signals, which were radiated by said switched transmission antenna array and were reflected by said at least one radar target, wherein:

the angular positions of said at least one radar target are determined according to an ESPRIT method based on the first set and the second set of received signals.

14. A radar apparatus, comprising:

a switched transmission antenna array having a plurality of transmission antennas, each of which radiates a radar transmission signal one after the other corresponding to a predetermined switching sequence;

a first receiving antenna for receiving a first set of received signals, which were radiated by said switched transmission antenna array and were reflected by said at least one radar target;

a second receiving antenna for receiving a second set of received signals, which were radiated by said switched transmission antenna array and were reflected by said at least one radar target; and an evaluation unit, which determines the angular positions of said at least one radar target based on the first set of received signals and the second set of received signals using an ESPRIT method.

15. The radar apparatus as claimed in claim 14, wherein:

the radar apparatus includes a switching matrix, which is designed to switch the transmission antennas of the transmission antenna array to a transmission path one after the other corresponding to the predetermined switching sequence;

said transmission antenna array comprises a plurality of transmission antennas linearly arranged next to one another;

the transmission antennas of the transmission antenna array are arranged at a constant distance from one another; and the first receiving antenna is arranged spaced from the second receiving antenna.

* * * * *